United States Patent [19]

Mori et al.

[11] Patent Number: 4,895,767

[45] Date of Patent: Jan. 23, 1990

[54] TRANSPARENT ARTICLE AND PROCESS FOR PREPARATION THEREOF

[75] Inventors: Kaoru Mori, Shiga; Naoki Shimoyama, Otsu; Takashi Taniquchi, Shiga, all of Japan

[73] Assignee: Toray Industries, Inc., Japan

[21] Appl. No.: 208,845

[22] Filed: Jun. 17, 1988

Related U.S. Application Data

[63] Continuation of Ser. No. 819,152, Jan. 14, 1986, abandoned.

[30] Foreign Application Priority Data

Mar. 22, 1985 [JP] Japan .................................. 60-56114

[51] Int. Cl.$^4$ ..................... B32B 9/04; B32B 27/36; B32B 17/06; G02B 5/28
[52] U.S. Cl. .................... 428/447; 428/412; 428/328; 428/429; 428/702; 428/414; 428/448; 428/413; 428/415; 427/164; 427/166; 427/167; 350/276 R; 351/166
[58] Field of Search ............... 428/429, 414, 415, 413, 428/448, 702, 328, 412, 447; 427/164, 166, 167; 350/276 R, 409; 351/44, 163, 166

[56] References Cited

U.S. PATENT DOCUMENTS

| | | | |
|---|---|---|---|
| 3,986,997 | 10/1976 | Clark | 260/292 |
| 4,161,547 | 7/1979 | Kienel | 428/412 |
| 4,211,823 | 7/1980 | Suzuki et al. | 428/412 |
| 4,294,950 | 10/1981 | Kato | 428/447 |
| 4,442,168 | 4/1984 | White et al. | 428/331 |
| 4,487,904 | 12/1984 | Fukuda et al. | 526/301 |
| 4,500,669 | 2/1985 | Ashlock et al. | 524/440 |
| 4,525,421 | 6/1985 | Kubota et al. | 428/412 |
| 4,542,201 | 9/1985 | Kanemura et al. | 526/314 |
| 4,590,117 | 5/1986 | Taniguchi et al. | 428/212 |
| 4,680,232 | 7/1987 | Factor et al. | 428/412 |
| 4,702,773 | 10/1987 | Ashlock et al. | 428/412 X |

FOREIGN PATENT DOCUMENTS

| | | | |
|---|---|---|---|
| 035609 | 9/1981 | European Pat. Off. | |
| 3335557 | 8/1984 | Fed. Rep. of Germany | 428/451 |
| 2539234 | 7/1984 | France | |
| 16892282 | of 0000 | Japan | |
| 116003 | 9/1981 | Japan | 428/412 |
| 168922 | 10/1982 | Japan | |
| 0204031 | 11/1983 | Japan | |
| 38262 | 3/1984 | Japan | |
| 51908 | 3/1984 | Japan | |
| 2064987 | 6/1981 | United Kingdom | |
| 2072191 | 9/1981 | United Kingdom | |

OTHER PUBLICATIONS

"Optics of Thin Film", A. Vesicek, North-Holland Publishing Company, Amsterdam, pp. 159-283 (1960).

Primary Examiner—Ellis P. Robinson
Assistant Examiner—Susan S. Rucker
Attorney, Agent, or Firm—Austin R. Miller

[57] ABSTRACT

A transparent article comprising on the surface of a transparent substrate a cured transparent coating film composed of a composition comprising 100 parts by weight of an organic silicon compound represented by the following general formula (I) and/or a hydrolysis product thereof:

$$R^1_a R^2_b Si(OR^3)_{4-a-b} \qquad (I)$$

wherein $R^1$ and $R^2$ each stand for an alkyl group, an alkenyl group, an aryl group or a hydrocarbon group having a halogen group, an epoxy group, a glycidoxy group, an amino group, a mercapto group, a methacryloxy group or a cyano group, $R^3$ stands for an alkyl group having 1 to 8 carbon atoms, an alkoxyalkyl group, an acyl group or a phenyl group, and a and b are 0 or 1, 10 to 300 parts by weight of a polyfunctional epoxy resin having an aromatic ring and/or an aliphatic ring and 25 to 800 parts by weight of antimony oxide fine particles having an average particle size of 1 to 200 mμ.

18 Claims, No Drawings

TRANSPARENT ARTICLE AND PROCESS FOR PREPARATION THEREOF

This application is a continuation of application Ser. No. 819,152, filed 1/14/86, now abandoned.

BACKGROUND OF THE INVENTION (1) Field of the Invention

The present invention relates to a transparent article suitable for spectacle lenses, camera lenses and other optical articles, which is excellent in scratch resistance, abrasion resistance, impact resistance, chemical resistance, flexibility, heat resistance, light stability and weatherability and which shows a good light fastness when dyed, and a process for the preparation of this transparent article.

(2) Description of the Prior Art

Plastic articles represented by plastic lenses have very excellent impact resistance and transparency and a light weight and can be easily dyed. Accordingly, demands for such plastic articles are increasing in these days. However, plastic lenses are defective in that they have a lower surface hardness than inorganic glass lenses and they are readily scratched. Furthermore, since the mechanical strength of plastic lenses is lower than that of inorganic glass lenses, the thickness of the central portion of the lens should be increased. Moreover, since the refractive index of plastic lenses is lower than that of inorganic glass lenses, the edge portion is extremely thick especially in case of high-diopter myopia lenses, and outward appearance is bad and wearing is often shunned from the viewpoint of fashion.

Trials to eliminate the above-mentioned defect of the easy-scratching property have been proposed. For example, there are known a method in which an inorganic substance such as $SiO_2$ is coated on a plastic substrate by vacuum evaporation deposition (see Japanese Unexamined Patent Publication No. 58-204031), and a method in which a polyorganosilane hard coat film or an acrylic hard coat film is formed on the surface of a plastic substrate (see U.S. Pat. Nos. 3,986,997 and 4,211,823, and Japanese Unexamined Patent Publications Nos. 57-168922, 59-38262, 59-51908, 59-51954, 59-78240, 59-8936, 59-102964, 59-109528, 59-120663, 59-155437, 59-174629, 59-193969 and 59-204669). In order to eliminate the latter defect, that is, bad appearance owing to extreme increase of the thickness in the edge portion of a high-diopter lens, increase of the refractive index has been examined and various proposals have been made (see Japanese Examined Patent Publications No. 58-17527 and 58-14449, and Japanese Unexamined Patent Publications 57-28117, 57-54901, 57-102601, 57-104901, 58-18602, 58-72101, 59-87124, 59-93708 and 59-96109).

The conventional technique of improving the surface hardness by vacuum evaporation deposition of an inorganic substance such as $SiO_2$ can provide a high hardness, but is defective in that the adhesion to the substrate, the heat resistance, the impact resistance, the hot water resistance and the weatherability are degraded. Moreover, this conventional technique has a fatal defect of loss of dyeability, which is one of characteristics of a plastic lens.

The technique of forming a silane or acrylic type hard coat film, as disclosed in Japanese Unexamined Patent Publications No. 59-3826 and No. 59-51908, can impart excellent heat resistance, impact resistance and dyeability, but according to this technique, uniform control of the film thickness is difficult and if this technique is applied to a substrate having a refractive index higher than 1.55, an interference band, which is not formed in case of a plastic lens substrate having a refractive index lower than 1.55, is formed because of the difference of the refractive index between the substrate and the hard coat film. This problem can be solved by bringing the refractive index of the hard coat film close to that of the substrate, and Japanese Unexamined Patent Publication No. 57-168922 discloses a coating composition comprising an antimony pentoxide sol having a high refractive index and an organic silicon compound. However, this technique has a fatal defect of poor dyeability.

Moreover, as means for improving the surface hardness and the anti-reflection property of plastics, there is known a method in which $SiO_2$ having about 1 micron thickness is coated on a plastic substrate by vacuum evaporation deposition and a multi-layer anti-reflection film is coated thereon (see Japanese Unexamined Patent Publication No. 56113101)

Furthermore, Japanese Unexamined Patent Publications Nos. 59-48702, 59-78301 and 59-78304 disclose a method in which a polyorganosilane type hard coat film or a cured epoxy resin film is formed on the surface of a plastic substrate and an anti-reflection film composed of an inorganic substance is formed thereon.

The technique disclosed in Japanese Unexamined Patent Publication No. 56-113101 provides a high hardness and a high anti-reflection property, but this technique is defective in that the adhesion, heat resistance, impact resistance, hot water resistance and weatherability are degraded.

The technique disclosed in Japanese Unexamined Patent Publications Nos. 59-48702, 59-78301 and 59-78304 provides a high anti-reflection property, but the technique is defective in that the adhesion to the substrate is insufficient and a deep and wide scratch is readily formed. Moreover, the coating formed according to this technique is readily attached by water, an alcohol or the like, and the adhesion after dipping in hot water and the weatherability are poor.

We have conducted research with a view to solving the foregoing problems, and as the result, we have arrived at the present invention described hereinafter.

SUMMARY OF THE INVENTION

It is a primary object of the present invention to provide a transparent article which is excellent in scratch resistance, abrasion resistance, impact resistance, chemical resistance, flexibility, heat resistance, light stability, weatherability and dyeability and shows a good light fastness when dyed.

Another object of the present invention is to provide a transparent article in which the above-mentioned excellent characteristics are given to a plastic material having a high refractive index, which contains an aromatic ring or a halogen atom (exclusive of fluorine), without occurrence of an interference band causing reduction of the appearance characteristics.

Still another object of the present invention is to provide a transparent article which has good durability and heat resistance and is excellent in the anti-reflection property.

In accordance with one fundamental aspect of the present invention, there is provided a transparent article comprising on the surface of a transparent substrate a cured transparent coating film composed of a composition comprising 100 parts by weight of an organic silicon compound represented by the following general formula (I) and/or a hydrolysis product thereof:

$$R^1_a R^2_b Si(OR^3)_{4-a-b} \quad (I)$$

wherein $R^1$ and $R^2$ each stand for an alkyl group, an alkenyl group, an aryl group or a hydrocarbon group having a halogen group, an epoxy group, a glycidoxy group, an amino group, a mercapto group, a methacryloxy group or a cyano group, $R^3$ stands for an alkyl group having 1 to 8 carbon atoms, an alkoxyalkyl group, an acyl group or a phenyl group, and a and b are 0 or 1, 10 to 300 parts by weight of a polyfunctional epoxy resin having an aromatic ring and/or an aliphatic ring and 25 to 800 parts by weight of antimony oxide fine particles having an average particle size of 1 to 200 μm.

In accordance with a second aspect of the present invention, there is provided a transparent article as set forth above, in which a transition metal compound and/or a reaction product thereof is incorporated in said composition.

In accordance with a third aspect of the present invention, there is provided a transparent article as set forth above, in which a transparent coating film of an inorganic oxide is formed on the cured coating film.

DESCRIPTION OF THE PREFERRED EMBODIMENT

The present invention relates to a transparent article suitable for optical applications and a process for the preparation thereof. More particularly, the present invention relates to a transparent article comprising on the surface of a transparent substrate a cured transparent coating film composed of a composition comprising (A) 100 parts by weight of an organic silicon compound represented by the following general formula (I) and/or a hydrolysis product thereof:

$$R^1_a R^2_b Si(OR^3)_{4-a-b} \quad (I)$$

wherein $R^1$ and $R^2$ each stand for an alkyl group, an alkenyl group, an aryl group or a hydrocarbon group having a halogen group, an epoxy group, a glycidoxy group, an amino group, a mercapto group, a methacryloxy group or a cyano group, $R^3$ stands for an alkyl group having 1 to 8 carbon atoms, an alkoxyalkyl group, an acyl group or a phenyl group, and a and b are 0 or 1,
(B) 10 to 300 parts by weight of a polyfunctional epoxy resin having an aromatic ring and/or an aliphatic ring, and (C) 25 to 800 parts by weight of antimony oxide fine particles having an average particle size of 1 to 200 mμ, and a process for the preparation of this transparent article.

As the transparent substrate preferably used in the present invention, there can be mentioned inorganic glasses and various plastics such as acrylic resins, polycarbonates, diethylene glycol bisallyl carbonate polymers, (halogenated) bisphenol A di(meth)acrylate homopolymers and copolymers, and (halogenated) bisphenol A urethane-modified di(meth)acrylate homopolymers and copolymers. In order to prevent formation of a rainbow by the interference effect of light, it is especially preferred that a transparent substrate having a refractive index of at least 1.55 be used. A plastic material having an aromatic ring in the main chain and/or the side chain and having a refractive index of at least 1.55 is practically preferred.

As the resin having an aromatic ring in the main chain and/or the side chain and having a refractive index of at least 1.55, there can be mentioned polymers of a styrene derivative represented by the following general formula (II):

wherein R' stands for a halogen group exclusive of fluorine, a methyl group, an ethyl group, a methoxy group, an amino group, a nitro group, a phenyl group or a phenoxy group, n is an integer of 0 to 5, and when n is 2 or larger, a plurality of R' may be the same or different, polymers of esters of (meth)acrylic acid with phenol, a substituted phenol or an ethylene oxide or propylene oxide adduct thereof, polymers of esters of (meth)acrylic acid or di(meth)acrylic acid with phenol, a substituted phenol or an ethylene oxide or propylene oxide adduct thereof, polymers of an addition reaction product between a mono(meth)acrylic acid ester having a hydroxyl group and an isocyanate compound, polymers of (meth)acrylic acid esters or di(meth)acrylic acid esters having a biphenyl skeleton, polymers of esters of (meth)acrylic acid with benzyl alcohol or a substituted benzyl alcohol, polymers of divinyl benzene or a substituted divinyl benzene, bisphenol A type epoxy resins, and bisphenol F type epoxy resins. Resins having an aromatic ring and a refractive index of at least 1.55 are preferably used without any limitation. Furthermore, copolymers of an aromatic ring-containing monomer as described above with a copolymerizable monomer having no aromatic ring may be used, so far as it has a refractive index of at least 1.55.

The transparent article of the present invention is formed by coating the surface of the above-mentioned transparent substrate with a composition comprising 100 parts by weight of an organic silicon compound represented by the general formula (I) and/or a hydrolysis product thereof, 10 to 300 parts by weight of a polyfunctional epoxy resin having an aromatic ring and/or an aliphatic ring and 25 to 800 parts by weight of antimony oxide fine particles having an average particle size of 1 to 200 mμ. As typical instances of the organic silicon compound represented by the general formula $R^1_a R^2_b Si(OR^3)_{4-a-b}$ and/or the hydrolysis product thereof, there can be mentioned tetraalkoxysilanes such as methyl silicate, ethyl silicate, n-propylsilicate, i-propyl silicate, n-butyl silicate, sec-butyl silicate, t-butyl silicate and hydrolysis products thereof, trialkoxysilanes, triacyloxysilanes and triphenoxysilanes such as methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilne, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-aminopropyltrimethoxysilane, γ-mercaptopropyltrimethoxysilane, γ-mercaptopropyltriethoxysilane, N-β-(aminoethyl)-γ-aminopropyltrimethoxysilane, β-cyanoethyltriethoxysilane, methyltriphenoxysilane, chloromethyltrimethoxysilane, chloromethyltriethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, δ-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane-, γ-glycidoxypropyltriethoxysilane, γ-glycidoxypropyltripropoxysilane, γ-glycidoxypropyltributoxysilane, γ-glycidoxypropyltrimethoxyethoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, 6-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl) ethyltrimethoxyethoxysilane, β-(3,4-epoxycyclohexyl) ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane and hydrolysis products thereof, and dialkoxysilanes and diacyloxysilanes such as dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiehoxysilane, methylvinyldimethoxysilane, methylvinyldiethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldimethoxyethoxysilane, γ-glycidoxypropylmethyldiphenoxysilane, γ-glycidoxypropylethyldimethoxysilane, γ-glycidoxypropylethyldiethoxysilane, γ-glycidoxypropylethyldipropoxysilane, γ-glyoidoxypropylvinyldimethoxysilane, γ-glycidoxypropyldinyldiethoxysilane, γ-glycidoxypropylphenyldimethoxysilane, γ-glycidoxypropylphenyldiethoxysilane and hydrolysis products thereof.

These organic silicon compounds may be used singly or in the form of mixtures of two or more of them. In order to impart a dyeability, it is preferred that an organic silicon compound containing an epoxy group or glycidoxy group be used.

In order to lower the curing temperature and promote the advance of curing, it is preferred that these organic silicon compounds be used in the hydrolyzed state.

The hydrolysis product may be prepared by adding pure water or an acidic aqueous solution such as hydrochloric acid, acetic acid or sulfuric acid to the organic silane compound and stirring the mixture The degree of the hydrolysis can be easily controlled by adjusting the amount added to pure water or the acidic aqueous solution. In order to promote curing, it is especially preferred that pure water or the acidic aqueous solution be added in an amount of 1 to 3 moles per mole of the group $OR^3$ in the general formula (I).

Since an alcohol or the like is formed by the hydrolysis, it is possible to perform the hydrolysis in the absence of a solvent, but in order to perform the hydrolysis uniformly, it is possible to carry out the hydrolysis after the organic silicon compound is mixed with a solvent. An appropriate amount of an alcohol or the like formed by the hydrolysis may be removed by heating and/or under a reduced pressure according to need, and an appropriate solvent may be added after the removal of the alcohol or the like. As the solvent, there can be mentioned alcohols, esters, ethers, ketones, halogenated hydrocarbon and aromatic hydrocarbons such as toluene and xylene. A mixed solvent of two or more of these solvents may be used according to need. In order to promote the hydrolysis reaction and advance precondensation or other reaction, it is possible to elevate the temperature above room temperature. Needless to say, the hydrolysis temperature may be reduced below room temperature so as to control precondensation.

As antimony oxide fine particles having an average particle size of 1 to 200 mμ, there can be mentioned an antimony oxide sol formed by colloidally dispersing antimony trioxide and/or antimony pentoxide in water and/or an organic solvent such as an alcohol. In order to attain the objects of the present invention, particles having an average particle size of 1 to 200 mμ, preferably 5 to 100 mμ, are used. If the average particle size exceeds 200 mμ, the transparency of the formed coating is poor and the formed coating was very opaque. In view of the toxicity and the like, use of antimony pentoxide is preferred.

A surface active agent or an amine may be added so as to improve the dispersibility of antimony oxide particles. Furthermore, the particles may be coated with other inorganic oxide such as zirconuum oxide.

As typical instances of the polyfunctional epoxy resin having an aromatic ring or an aliphatic ring, there can be mentioned epoxy resins represented by the following general formulae (III), (IV) and (V):

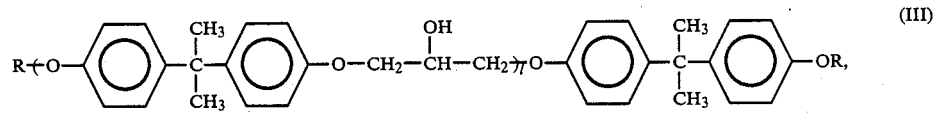

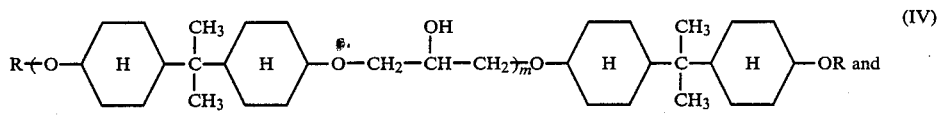

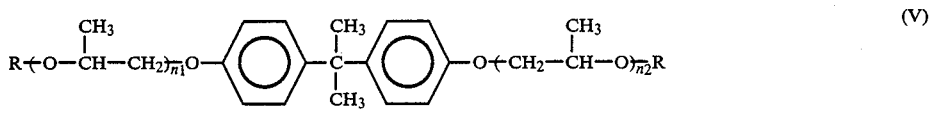

wherein R stands for a glycidyl group and $l$, $m$, $n_1$ and $n_2$ are integers of from 0 to 15.

The epoxy equivalent of the epoxy resin represented by the general formula (III), (IV) or (V) is not particularly critical, but in view of the compatibility with other components and the handling property, it is preferred that an epoxy resin having an epoxy equivalent smaller than 400 be used.

A curing agent capable of promoting curing and making it possible to perform curing at a low temperature may be added to the coating composition used for formation of the coating film. Various epoxy resin curing agents and organic silicon resin curing agents may be used as the curing agent.

As specific examples of the curing agent, there can be mentioned various organic acids, acid anhydrides, nitrogen-containing organic compounds, various metal complex compounds, metal alkoxides, and alkali metal salts of organic carboxylic acid and carbonic acid. Mixtures of two or more of these curing agents may be used. In the present invention, in view of the stability of the coating composition and the coloration of the coating, aluminum chelate compounds described below are especially valuable as the curing agent.

For example, there can be mentioned aluminum chelate compounds represented by the following general formula:

$$AlX_nY_{3-n}$$

X stands for OL (in which L stands for a lower alkyl group), Y is at least one member selected from a ligand derived from a compound of the formula $M^1COCH_2COM^2$ (in which $M^1$ and $M^2$ each stand for a lower alkyl group) and a ligand derived from a compound of the formula $M^3COCH_2COOM^4$ (in which $M^3$ and $M^4$ each stand for a lower alkyl group), and n is 0, 1 or 2.

Various compounds can be mentioned as the aluminum chelate compound of the formula $AlX_nY_{3-n}$ valuable as the curing agent. In view of the solubility in the composition, the stability and the effect as the curing catalyst, there are preferably used-aluminum acetylacetonate, aluminum bisethylacetoacetate monoacetylacetonate, aluminum di-n-butoxide monoethylacetoacetate and aluminum di-isopropoxide monomethylacetoacetate. A mixture of two or more of these aluminum chelate compounds may be used.

The coating obtained from the above-mentioned composition of the present invention can be easily dyed with various dyes, especially disperse dyes. In order to improve the light fastness of the dyed coating, it is preferred that a transition metal compound or a reaction product thereof especially having a function of a singlet state oxygen quencher, be added. As specific examples of the metal compound, there can be mentioned acetylactonate metal salts, bisdithiol-δ-diketone metal salts, bisphenylthiol metal salts, bisphenyldithiol metal salts, thiocathecol metal salts, dithiocarbamic acid metal salts, salicylaldehyde-oxide metal salts, thiobisphenolate metal salts and phosphonous acid metal salts. Acetylacetonate chelate compounds have a good stability in the coating composition, and therefore, they are preferably used. The amount added of the transition metal compound should be experimentally decided according to the intended used of the article, the kind of the diluent and the kinds of other components, but in view of the solubility and the transparency of the coating, it is preferred that the transition metal compound be contained in the formed coating in an amount of 0.001 to 10% by weight. If the amount of the transition metal compound is smaller than 0.001% by weight, no substantial effect can be attained by the addition, and if the amount of the transition metal compound is larger than 10% by weight, the coating becomes very cloudy. Even if the bonding state of the metal is changed in the transition metal compound during the formation of the coating, no problem arises, but in order to enhance the effect, it is preferred that the transition metal be contained in the form of a chelate compound in the coating.

In order to improve the flowability of the coating composition at the coating step and also improve the smoothness of the coating to reduce the friction coefficient of the surface of the coating, various surface active agents may be incorporated into the coating composition of the present invention, and a block or graft copolymer of dimethylsiloxane and alkylene oxide and a fluorine type surface active agent are especially effective. Furthermore, a dye or pigment or a filler may be dispersed or an organic polymer may be dissolved to color the coating or improve the coating property, the adhesion to the substrate, the physical properties and other practical utility characteristicxs of the coating composition.

Furthermore, an ultraviolet absorber may be incorporated so as to improve the weatherability, and an antioxidant may be added to improve the resistance against the thermal deterioration.

The coating film of the present invention can be obtained by curing the above-mentioned coating composition, and curing is accomplished by a heat treatment. The range of the heating temperature is considerably broader than in the conventional coating compositions, and satisfactory results can be obtained if the heating temperature is 50° to 250° C.

Ordinary coating methods such as brush coating, dip coating, roll coating, spray coating, spin coating and flow coating may be adopted as means for coating the coating composition on the transparent substrate.

When the coating composition is coated in the present invention, various preliminary treatments of the substrate may be effectively adopted to attain a cleaning effect and improve the adhesion and water resistance. An activating gas treatment and a chemical treatment are especially preferred.

Furthermore various compounds may be added to the coating of the present invention for improving the dyeability, weatherability, hardness and other characteristics. For example, organic polymers and reactive organic compounds such as aliphatic epoxy resins, acrylic resins, polyvinyl alcohol and cellulose type polymers can be mentioned. Moreover, fine particles of inorganic oxides such as silicon oxide, zirconium oxide and titanium oxide, may be added, and sols of these fine particles in various dispersion media are especially preferred in view of the compatibility and transparency.

An activated gas, an ion or an electron formed under atmospheric or reduced pressure is used for the activating gas treatment. As means for generating the activating gas, there can be mentioned, for example, a corona discharge treatment and a high-voltage discharge treatment by a direct current, a low-frequency wave, a high-frequency wave or a microwave under reduced pressure.

From the viewpoint of the reproducibility or production efficiency, a treatment with a low-temperature plasma obtained by high-frequency wave discharge under reduced pressure is especially preferred.

The kind of the gas used for the treatment is not particularly critical. For example, there may be used oxygen, nitrogen, hydrogen, carbon dioxide gas, sulfur dioxide, helium, neon, argon, freon, water vapor, ammonia, carbon monoxide, chlorine, nitrogen monoxide and nitrogen dioxide.

These gases may be used singly or in the form of mixtures of two or more of them. An oxygen-containing gas is preferred among these gases, and air present in the natural world may be used. Pure oxygen is most preferred because pure oxygen is effective for improving the adhesion. In order to attain this effect, the temperature of the substrate to be treated may be elevated at the preliminary treatment.

As the chemical treatment, there can be mentioned, for example, a treatment with an alkali, a treatment with an acid such as hydrochloric acid, sulfuric acid, potassium permanganate or potassium dichromate, and a treatment with an organic solvent having an aromatic ring.

The foregoing preliminary treatments may be performed in combination continuously or stepwise. A chemical treatment with a mixed liquid of potassium dichromate and sulfuric acid is especially effective for improving the adhesion.

The thickness of the coating film is not particularly critical in the present invention. From the viewpoint of the bonding strength or the hardness, it is preferred that the thickness of the coating film be 0.1 to 20 microns, especially 0.4 to 10 microns. In order to improve the operation adaptability and adjust the thickness of the coating film, the coating composition is diluted with a solvent at the coating step. As the diluting solvent, there may be used, for example, water, alcohols, esters, ethers, halogenated hydrocarbons, dimethylformamide and dimethylsulfoxide. A mixed solvent may be used according to need. From the viewpoint of the dispersibility of antimony oxide, there are preferably used water, alcohols, dimethylformamide, ethylene glycol, diethylene glycol, triethylene glycol, benzyl alcohol, phenetyl alcohol and phenyl cellosolve.

According to the second aspect of the present invention, there are provided a transparent article of the first aspect, in which a transparent film composed of an inorganic oxide is formed on the cured transparent coating film containing antimony oxide particles, and a process for the preparation of this transparent article.

By appropriately combining these transparent films, there can be freely attained an effect of imparting an anti-reflection property or an effect of increasing the reflection. The above-mentioned activating gas treatment or chemical treatment may be carried out prior to formation of the transparent film. The surface treatment with an activating gas may be divided into the steps of vacuum evaporation deposition described below and ion plating, but in order to improve the production efficiency and further improve the adhesion, it is preferred that these operations be carried out in the same chamber. When the activating gas treatment is adopted, optimum conditions should be experimentally determined according to the composition of the antimony oxide-containing coating, the curing conditions, the film thickness and whether or not dyeing is performed. In the present invention, the transparent film of the inorganic oxide may have a single layer structure or a multi-layer structure, but it is preferred that the transparent film be composed of an inorganic oxide having an oxygen gas barrier property and this transparent film be formed as a first layer on the transparent cured coating film.

In accordance with a most preferred embodiment of the present invention, the antimony oxide-containing coating film is dyed with a disperse dye in advance and the transparent film of the inorganic oxide is then formed.

A substance having a high hardness is essentially preferred as the substance constituting the transparent film of the inorganic oxide, and various inorganic compounds including metal oxides and semi-metal oxides are used. An inorganic oxide capable of forming a transparent film in which the oxygen permeation coefficient defined below is less than $20 \times 10^{-11}$ $cm^3 \cdot cm/cm^2 \cdot sec \cdot cmHg$, is preferably used. The oxygen permeation coefficient is a criterion indicating the oxygen gas permeability, which is defined as an amount ($cm^3$) of oxygen permeating a plane plate having a thickness of 1 cm for a unit time (second) per unit area ($cm^2$) of the surface of the plate under an oxygen partial pressure difference of 1 cmHg.

In order to improve the light fastness of the dyeing, $SiO_2$, $Al_2O_3$, $Yb_2O_3$ and $ZrO_2$ are preferably used as the inorganic oxide. Various modifications such as mixing of this inorganic oxide with other inorganic oxide and formation of a multi-layer structure by piling may be adopted.

According to a preferred embodiment applicable to spectacle lenses and camera lenses, two or more of the foregoing inorganic compounds are appropriately combined or other inorganic oxide is further used according to need, whereby an anti-reflection property can be imparted. According to another preferred embodiment, a coating film containing 5 to 80% by weight of antimony oxide particles, formed on the surface of a transparent substrate, is dyed with a disperse dye or the like and then, an anti-reflection property is imparted in the above-mentioned manner.

The anti-reflection film may have a single layer structure or a multi-layer structure, but from the viewpoint of the anti-reflection effect, a multi-layer structure including at least two layers is preferred.

An inorganic substance having essentially a high hardness is preferably used as the substance forming the anti-reflection film, and oxides, fluorides, silicides, borides, carbides, nitrides and sulfides of metals and semi-metals can be mentioned.

As the metal oxide, there can be mentioned SiO, $SiO_2$, $ZrO_2$, $Al_2O_3$, TiO, $TiO_2$, $Ti_2O_3$, $Y_2O_3$, $Yb_2O_3$, MgO, $Ta_2O_5$, $CeO_2$ and $HfO_2$. As the fluoride, there can be mentioned $MgF_2$, $AlF_3$, $BaF_2$, $CaF_2$, $Na_3AlF_6$ and $Na_5Al_3F_{14}$. As the nitride, there can be mentioned $Si_3N_4$. As the metal, there can be mentioned Cr, W and Ta.

The foregoing substances may be used singly or in the form of mixtures of two or more of them.

As means for forming the above-mentioned substance into a single-layer or multi-layer anti-reflection film, there can be mentioned, for example, vacuum evaporation deposition, sputtering, ion plating and ion beam assist methods.

The transparent article of the present invention is effective for improving the flame retardancy of ordinary plastics, and even if the present invention is applied to a transparent substrate having a high refractive index, an interference band is not formed. Since the transparent article of the present invention has a high surface hardness which is durable and shows a high light fastness when dyed, the transparent article of the present invention is suitably used for not only a ophthalmic lens having a thin thickness but also a lens of a camera or a binocular lens.

The present invention will now be described in detail with reference to the following examples that by no means limit the scope of the invention.

EXAMPLE 1

(1) Preparation of Resin to be

Cast polymerization of 30 parts of styrene and 70 parts of a monomer including a polyfunctional acrylate monomer formed by adding 0.9 mole of hexamethylene diisocyanate to 1 mole of a hydroxyl group-containing compound obtained by bonding by esterification 1 mole of acrylic acid to an adduct of two moles of ethylene oxide to tetrabromobisphenol A was carried out by using isopropyl peroxide as the polymerization initiator, and the obtained substrate was subjected to a low-temperature plasma treatment to obtain a surface-treated substrate. The refractive index of the obtained resin was 1.6.

(2) Preparation of Coating Composition (a) Preparation of Hydrolysis Product of γ-Glycidoxypropyltrimethoxysilane A reaction vessel equipped with a rotor was charged with 95.3 g of γ-glycidoxypropyltrimethoxysilane, and 21.8 g of a 0.01N aqueous solution of hydrochloric acid was gradually added with stirring while maintaining the liquid temperature at 10° C. After the dropwise addition, cooling was stopped to obtain a hydrolysis product of γ-glyoidoxypropyltrimethoxysilane.

(b) Preparation of Coating Composition

The above-mentioned hydrolyzed silane was mixed with 216 g of methanol, 216 g of dimethylformamide, 0.5 g of a fluorine type surface active agent and 67.5 g of a bisphenol A type epoxy resin (Epikote 827 supplied by Shell Chemicals), and 270 g of a colloidal antimony pentoxide sol (Antimony Sol A-2550 supplied by Nissan Kagaku and having an average particle size of 60 mμ) and 13.5 g of aluminum acetylacetonate were added to the mixture. The mixture was sufficiently stirred to form a coating composition.

(3) Preparation of Plastic Article

The resin to be coated, prepared in (1) above, was dip-coated with the coating composition prepared in (2) above at a pull-up speed of 10 cm/min, and preliminary curing was carried out at 82° C. for 12 minutes. Then, the coated resin was heated at 93° C. for 4 hours to obtain a plastic article.

(4) Evaluation of Properties

The properties of the obtained plastic article were determined according to the following test methods. The obtained results were shown in Table 1.

(a) Steel Wool Hardness

The coated surface was rubbed with steel wool #0000 and the scratch degree was determined according to the following scale.

A: not scratched even by strong rubbing

B: slightly scratched by considerably strong scratching

C: scratched by weak rubbing

Incidentally, the coated surface was rubbed reciprocatively 5 times.

(b) Adhesion

Square cuts of 1 mm reaching the substrate were formed on the coated surfaces by using a steel knife. The number of the formed square cuts were 100. An adhesive cellophane tape (Celotape supplied by Nichiban) was tightly bonded to the cut coated surface, and the tape was promptly peeled in a direction of 90°. The peeling of the coating film was checked.

(c) Transparency

The transparency of the obtained plastic article was observed with the naked eye and evaluated according to the following scale.

o: no cloudiness on application of strong light

Δ: cloudiness observed on application of strong light x: cloudiness observed even without application of strong light (d) Reflection Interference Band A black cloth was placed below the obtained plastic article and light was applied to the article from a fluorescent lamp located 10 cm above the article. The reflected light was observed with the naked eye and it was checked whether or not an interference band was formed.

(e) Dyeability

A dyeing bath containing red, blue and yellow disperse dyes was prepared, and dyeing was carried out for 5 minutes at a liquid temperature of 93° C. The total light transmission of the dyed article was measured by using a color computer (supplied by Suga Shikenki).

When the total light transmission was lower than 50%, the dyeability was judged as being good.

(f) Weatherability

The obtained plastic article was exposed outdoors for 3 months, and the adhesion of the coating was checked.

EXAMPLE 2

The procedures of Example 1 were repeated in the same manner except that a coating composition shown in Table 1 was used.

The properties of the obtained plastic article were shown in Table 1.

EXAMPLE 3

The procedures of Example 1 were repeated in the same manner except that the resin to be coated was changed to a polycarbonate resin having a refractive index of 1.58.

The properties of the obtained plastic article were shown in Table 1.

COMPARATIVE EXAMPLES 1 THROUGH 3

The procedures of Example 1 were repeated in the same manner except that the coating composition was changed to a coating composition shown in Table 1.

The properties of the obtained plastic articles were shown in Table 1.

EXAMPLES 4 AND 5 AND COMPARATIVE EXAMPLES 4 AND 5

The procedures of Example 1 were repeated in the same manner except that the epoxy resin was changed to a compound shown in Table 1.

The properties of the obtained plastic articles were shown in Table 1. Incidentally, in Comparative Example 5, the phase separation was caused in the coating composition and coating was impossible.

utes at a bath temperature of 93° C. to effect dyeing. The obtained plastic article was dyed in a brown color and the total light transmission was 40%.

(4) Test of Light Fastness of Dyeing

The plastic article obtained in (3) above was exposed to a fade-o-meter (supplied by Suga Shikenki) for 20 hours. The obtained result was shown in Table 2. The light fastness was determined from the total light transmissions before and after the exposure according to the following equation:

$$\text{Light fastness (\%)} = \frac{(T_2 - T_1)}{(T_0 - T_1)} \times 100$$

wherein $T_0$ stands for the total light transmission before dyeing, $T_1$ stands for the total light transmission after dyeing but before exposure, and $T_2$ stands for the total light transmission after dyeing and exposure.

Incidentally, the refractive index of the coating film was 1.58, and a rainbow pattern owing to the difference of the refractive index between the substrate and the coating film was not observed and the appearance of the plastic article was good.

EXAMPLE 7

The procedures of Example 6 were repeated in the same manner except that the transition metal compound was changed to acetylacetone Ni (II). The obtained

TABLE 1

|  | Coating Composition (solid ratio) | Transparency | Hardness | Adhesion | Interference Band | Dyeability | Weatherability |
|---|---|---|---|---|---|---|---|
| Example 1 | GPS/Ep827/Sb$_2$O$_5$ = 50/50/100 | o | A | Good | Good | Good | Good |
| Example 2 | GMS/Ep827/Sb$_2$O$_5$ = 50/50/100 | o | A | Good | Good | Good | Good |
| Example 3 | GPS/Ep827/Sb$_2$O$_5$ = 50/50/100 | o | B | Good | Good | Good | Good |
| Comparative Example 1 | GPS/Ep827 = 50/50 | o | B | Good | Not Good | Good | Not Good |
| Comparative Example 2 | GPS/Sb$_2$O$_5$ = 50/50 | o | A | Good | Not Good | Good | Good |
| Comparative Example 3 | Ep827/Sb$_2$O$_5$ = 50/50 | x | C | Good | Good | Good | Good |
| Example 4 | GPS/Ep152/Sb$_2$O$_5$ = 50/50/100 | o | A | Good | Good | Good | Good |
| Example 5 | GPS/Epc750/Sb$_2$O$_5$ = 50/50/100 | o | A | Good | Good | Good | Good |
| Comparative Example 4 | GPS/EX-320/Sb$_2$O$_5$ = 50/50/100 | o | A | Good | Not Good | Not Good | Not Good |
| Comparative Example 5 | GPS/epoxidized butadiene/Sb$_2$O$_5$ = 50/50/100 | — | — | — | — | — | — |

Note
GPS: γ-glycidoxypropyltrimethoxysilane
Ep827: bisphenol A type epoxy resin (epoxy equivalent of 180 to 190)
Sb$_2$O$_5$: colloidal antimony pentoxide aqueous dispersion sol
GMS: γ-glycidoxypropylmethyldiethoxysilane
Ep152: novolak type epoxy resin (epoxy equivalent of 172 to 179)
Epc750: hydrogenated bisphenol A type epoxy resin (epoxy equivalent of 240 to 260)
EX-320: trimethylolpropane polyglycidylether (epoxy equivalent of 130)

EXAMPLE 6

(1) Preparation of Coating Composition

To the coating composition used in Example 1 was added 1.1 g of acetylacetone Cu(II) as the transition metal compound, and the mixture was sufficiently stirred to form a coating composition.

(2) Preparation of Plastic Article

The same activating gas-treated plastic substrate as used in Example 1 was dip-coated with the coating composition prepared in (1) above at a pull-up speed of 10 cm/min. Preliminary curing was carried out at 82° C. for 12 minutes and the coated substrate was heated at 130° C. for 2 hours to obtain a plastic article.

(3) Dyeing of Platic Article

A dyeing bath containing red, blue and yellow disperse dyes was prepared, and the plastic article obtained in (2) above was dipped in the dyeing bath for 10 min-result was shown in Table 2.

COMPARATIVE EXAMPLE 6

The procedures of Example 6 were repeated in the same manner except that a transition metal salt was not added at all. The obtained result was shown in Table 2.

TABLE 2

|  | Metal Salt | Light Fastness (%) |
|---|---|---|
| Example 6 | acetylacetone Cu (II) | 32.3 |
| Example 7 | acetylacetone Ni (II) | 28.4 |
| Comparative Example 6 | — | 38.5 |

EXAMPLES 8 THROUGH 11 AND COMPARATIVE EXAMPLE 7

(1) Dyeing of Coated Article

A coated article prepared in the same manner as described in Example 1 was dyed in a dyeing bath containing red, blue and yellow disperse dyes for 5 minutes at a bath temperature of 93° C. The coating was dyed in a brown color and the total light transmission was 50%.

(2) Preparation of Transparent Article

The dyed coated article obtained in (1) above was subjected to ion beam cleaning as a preliminary treatment and $SiO_2$, $Yb_2O_3$ or $ZrO_2$ was coated on both the surfaces at an optical thickness of $\lambda/2$ ($\lambda = 521$ nm) by vacuum evaporation deposition. Incidentally, in Comparative Example 7, an inorganic oxide was not coated at all.

(3) Light Fastness of Dyeing

The light fastness was tested in the same manner as described, though the test was conducted on the day different from the day when the test of Example 6 was carried out. The obtained results were shown in Table 3.

TABLE 3

| | Vacuum-Deposited Substance | Light Fastness (%) |
|---|---|---|
| Example 8 | $SiO_2$ | 11.4 |
| Example 9 | $Al_2O_3$ | 12.9 |
| Example 10 | $Yb_2O_3$ | 4.0 |
| Example 11 | $ZrO_2$ | 26.3 |
| Comparative Example 7 | — | 46.0 |

EXAMPLES 12 AND 13 AND COMPARATIVE EXAMPLE 8

The procedures of Example 8 were repeated in the same manner except that the inorganic oxide film formed in (2) of Example 8 was changed to a multi-layer film shown in Table 4.

Each of the obtained transparent articles had a reddish violet reflection interference color and a good anti-reflection effect. Other test results were shown in Table 4. Incidentally, in Comparative Example 8, no coating film was formed. The tests were carried out according to the following methods.

(a) Steel Wool Hardness

The coated surface was rubbed with steel wool #0000 and the scratch degree was evaluated according to the following scale.

A: not scratched even by strong rubbing
B: slightly scratched by considerably strong rubbing
C: scratched by weak rubbing Incidentally, the coated surface was rubbed reciprocatively 20 times.

(b) Adhesion

Square cuts of 1 mm reaching to the substrate were formed on the coated surface by a steel knife, and an adhesive cellophane tape (Celotape supplied by Nichiban) was strongly bonded to the cut surface. The number of the square cuts was 100. Then, the adhesive tape was promptly peeled in a direction of 90°, and it was checked whether or not the coating film was peeled.

(c) Appearance

The obtained transparent article was observed with the naked eye to evaluate the transparency and the coloring degree.

(d) Light Fastness

The light fastness was evaluated in the same manner as described in Example 6, though the test was conducted on the day different from the day when the test of Example 6 was carried out.

TABLE 4

| | | Test Results | | | |
|---|---|---|---|---|---|
| | Vacuum-Deposited Substance | Steel Wool Hardness | Adhesion | Appearance | Light Fastness (%) |
| Example 12 | $Al_2O_3/ZrO_2/SiO_2 = \lambda/4/\lambda/2/\lambda/4$ | A | Good | Good | 22.8 |
| Example 13 | $Al_2O_3/Yb_2O_3/SiO_2 = \lambda/4/\lambda/2/\lambda/4$ | A | Good | Good | 19.6 |
| Comparative Example 8 | — | B | Good | Good | 46.0 |

Note *: $\gamma = 521$ nm

EXAMPLE 14

(1) Preparation of Anti-Reflection Film

Inorganic substances, that is $ZrO_2/TiO_2$, $Ta_2O_5$ and $SiO_2$, were coated in this order on both the surfaces of the same coated substrate as used in Example 8 by vacuum evaporation deposition to form a multi-layer coating film in which the thickness of each layer was set at $\lambda/4$ ($\lambda = 521$ nm).

The reflection interference color of the obtained anti-reflection plastic article was green, and the total light transmission was 98%.

(2) Evaluation of Properties

The properties of the plastic article were tested according to the following methods. The obtained results were shown in Table 5.

(a) Steel Wool Hardness

The coated surface was rubbed with steel wool #0000, and the scratch degree was evaluated according to the following scale.

A: not scratched even by strong rubbing
B: slightly scratched by considerably strong rubbing
C: scratched by weak rubbing Incidentally, the coated surface was rubbed reciprocatively 20 times.

(b) Adhesion

Square cuts of 1 mm reaching the substrate were formed on the coated surface by a steel knife and an adhesive cellophane tape (Celotape supplied by Nichiban) was strongly bonded to the cut coated surface. The number of the square cuts was 100. The tape was promptly peeled in a direction of 90°, and it was checked whether or not the coating film was peeled.

(c) Transparency

The obtained plastic article was observed with the naked eye and the transparency was evaluated according to the following scale.

o: no cloudiness on application of strong light
Δ: cloudiness observed on application of strong light
x: cloudiness observed without application of strong light (d) Reflection Interference Band A black cloth was placed below the obtained plastic article, and light was applied to the article from a fluorescent lamp located 10 cm above the article. The reflected light was observed with the naked eye and it was checked whether or not an interference band was formed.

(e) Weatherability

The obtained plastic article was exposed outdoors for 3 months, and the adhesion of the coating film was evaluated.

EXAMPLE 15

The procedures of Example 14 were repeated in the same manner except that the coating composition was changed to a coating composition shown in Table 5.

The properties of the obtained plastic article were shown in Table 5.

COMPARATIVE EXAMPLES 9 THROUGH 11

The procedures of Example 14 were repeated in the same manner except that the coating composition was changed to a coating composition shown in Table 5.

The properties of the obtained plastic articles were shown in Table 5.

COMPARATIVE EXAMPLE 12

A plastic article having an anti-reflection property was prepared in the same manner as described in Example 14 except that the coating composition was not coated at all.

The properties of the obtained plastic article were shown in Table 5.

ing a halogen group, an epoxy group, a glycidoxy group, an amino group, a mercapto group, a methacrylate group or a cyano group, $R^3$ stands for an alkyl group having 1 to 8 carbon atoms, an alkoxyalkyl group, an acyl group or a phenyl group, and a and b are 0 or 1, 10 to 300 parts by weight of a polyfunctinal epoxy resin having an aromatic ring and/or an aliphatic ring, said epoxy resin being selected from the group consisting of:

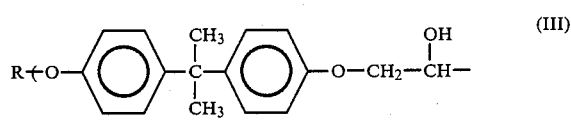  (III)

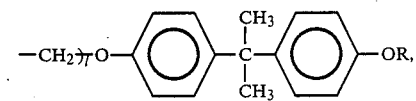

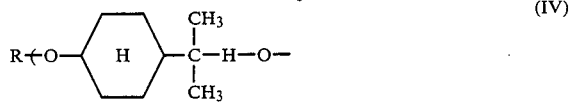  (IV)

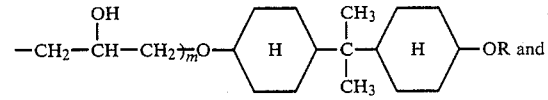  and

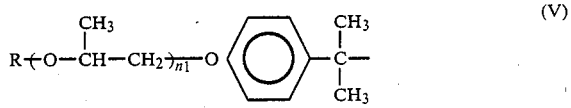  (V)

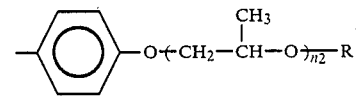

TABLE 5

| | Coating Composition (solid ratio) | Transparency | Hardness | Adhesion | Interference Band | Weatherability |
|---|---|---|---|---|---|---|
| Example 14 | GPS/Ep827/Sb$_2$O$_5$ = 50/50/100 | o | A | Good | Good | Good |
| Example 15 | GPS/GMS/Ep827/Sb$_2$O$_5$ = 25/25/50/100 | o | A | Good | Good | Good |
| Comparative Example 9 | GPS | o | C | Good | Not Good | Not Good |
| Comparative Example 10 | GPS/Ep827/MS = 50/50/100 | o | A | Good | Not Good | Not Good |
| Comparative Example 11 | GPS/Ep827 = 10/90 | o | C | Good | Good | Not Good |
| Comparative Example 12 | — | o | C | Good | Good | Not Good |

We claim:

1. A transparent article comprising on the surface of a transparent substrate a cured transparent coating film composed of a composition comprising 100 parts by weight of an organic silicon compound represented by the following general formula (I) and/or a hydrolysis product thereof:

$$R^1{}_a R^2{}_b Si(OR^3)_{4-a-b} \quad (I)$$

wherein $R^1$ and $R^2$ each stand for an alkyl group, an alkenyl group, an aryl group or a hydrocarbon group havwherein R stands for a glycidyl group and l, m, $n_1$ and $n_2$ are integers of from 0 to 15 and 25 to 800 parts by weight of antimony oxide fine particles having an average particle size of 1 to 200 mμ.

2. A transparent article as set forth in claim 1, wherein the epoxy equivalent of the polyfunctional epoxy resin having an aromatic ring and/or an aliphatic ring is 180 to 400.

3. A transparent article as set forth in claim 1, wherein the transparent substrate is composed of a plastic material.

4. A transparent article as set forth in claim 3, wherein the refractive index of the plastic material is 1.54 to 1.70.

5. A transparent article as set forth in claim 1, wherein the transparent substrate is composed of an inorganic glass.

6. A transparent article as set forth in claim 1, wherein the cured transparent film is one cured by heating.

7. A transparent article as set forth in claim 1, wherein $R^1$ and $R^2$ each stand for an alkyl group, an alkenyl group, an aryl group or a hydrocarbon group having a halogen group, an epoxy group, a glycidoxy group, an amino group, a mercapto group, a methacrylate group or a cyano group, $R^3$ stands for an alkyl group having 1 to 8 carbon atoms, an alkoxyalkyl group, an acyl group or a phenyl group, and a and b are 0 or 1, 10 to 300 parts by weight of a polyfunctional epoxy resin having an aromatic ring and/or an aliphatic ring, said epoxy resin being selected from the group consisting of:

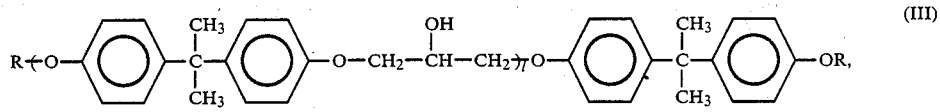

(III)

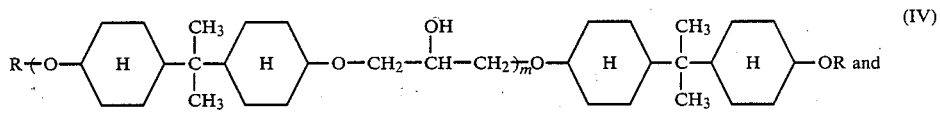

(IV)

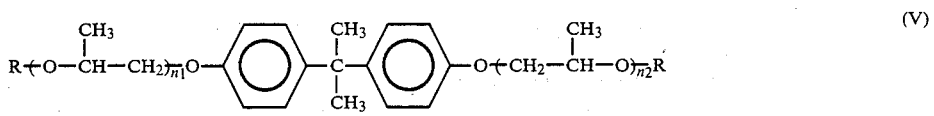

(V)

wherein the antimony oxide fine particles are composed of antimony pentoxide.

8. A transparent article as set forth in claim 1, wherein the transparent substrate is composed of a plastic material containing a halogen atom (exclusive of fluorine).

9. A transparent article as set forth in claim 1, wherein the cured transparent film contains a transition metal compound and/or a reaction product thereof.

10. A transparent article as set forth in claim 9, wherein the transition metal compound and/or the reaction product thereof is a chelate compound of at least one metal selected from Cu, Ni, Mn, Co and Fe.

11. A transparent article as set forth in claim 9, wherein the transition metal compound and/or the reaction product has the function of a singlet state oxygen quencher.

12. A transparent article comprising on the surface of a transparent substrate a cured transparent coating film composed of a composition comprising 100 parts by weight of an organic silicon compound represented by the following general formula (I) and/or a hydrolysis product thereof:

$$R^1_a R^2_b Si(OR^3)_{4-a-b} \quad (I)$$

wherein

R stands for a glycidyl group and l, m, $n_1$ and $n_2$ are integers of from 0 to 15 and 25 to 800 parts by weight of antimony oxide fine particles having an average particle size of 1 to 200 mμ, and a transparent film composed of an inorganic oxide, which is formed on the cured transparent film.

13. A transparent article as set forth in claim 12, wherein the inorganic oxide is at least one member selected from $SiO_2$, $Al_2O_3$, $Yb_2O_3$ and $ZrO_2$.

14. A transparent article as set forth in claim 12, wherein the transparent film of the inorganic oxide is a multi-layer film having at least two layers.

15. A transparent article as set forth in claim 12, wherein the transparent film of the inorganic oxide is an anti-reflection film.

16. A transparent article as set forth in claim 12, which is an optical article.

17. A transparent article as set forth in claim 16, wherein the optical article is a spectacle lens.

18. A process for the preparation of a transparent article as set forth in claim 12 wherein the transparent film of the inorganic oxide is formed by vacuum evaporation deposition.

* * * * *

UNITED STATES PATENT AND TRADEMARK OFFICE
CERTIFICATE OF CORRECTION

PATENT NO. : 4,895,767
DATED : Jan. 23, 1990
INVENTOR(S) : Kaoru Mori, Naoki Shimoyama, Takashi Taniguchi It is certified that error appears in the above-identified patent and that said Letters Patent is hereby corrected as shown below:

Column 1, line 45, change "59-8936" to --59-89368--

Column 5, line 23, change "6-glycidoxybutyltrime" to --$\delta$-glycidoxybutyltrime--.

Column 6, line 1, change "y-glycidoxypropyldinyl" to --y-glycidoxypropylvinyl--.

Column 11, line 61, change "y-gIyoidoxypropyltrimethoxysilane" to
--y-glycidoxypropyltrimethoxysilane--.

Signed and Sealed this

Fourth Day of June, 1991

Attest:

HARRY F. MANBECK, JR.

Attesting Officer

Commissioner of Patents and Trademarks